United States Patent [19]

Ricciardi

[11] 4,042,051
[45] Aug. 16, 1977

[54] FLEXIBLY MOUNTED CONTAINER SYSTEM

[76] Inventor: Ronald J. Ricciardi, 108 Malcolm Drive, Garfield, N.J. 07026

[21] Appl. No.: 568,551

[22] Filed: Apr. 16, 1975

Related U.S. Application Data

[63] Continuation-in-part of Ser. No. 498,124, Aug. 16, 1974, abandoned.

[51] Int. Cl.$^2$ ................ G01G 21/24; F16C 11/12
[52] U.S. Cl. ............... 177/255; 177/DIG. 9; 308/2 A
[58] Field of Search .......... 177/255, 229, 47, DIG. 9; 308/2 A

[56] References Cited

U.S. PATENT DOCUMENTS

| | | |
|---|---|---|
| 392,617 | 11/1888 | Lieb et al. .................. 177/DIG. 9 |
| 3,347,328 | 10/1967 | Schieser et al. .................. 177/229 |
| 3,709,311 | 1/1973 | Appius .................. 177/DIG. 9 |
| Re. 27,056 | 2/1971 | Connors et al. .................. 177/47 |

Primary Examiner—George H. Miller, Jr.
Attorney, Agent, or Firm—Edwin T. Grimes

[57] ABSTRACT

This invention relates to a container system, which includes a container having a mounting bracket mounted thereon to carry a first flange-like element, a second flange-like element disposed in spaced parallel relationship with respect to the first flange-like element, a linking member mounted on the second flange-like element, which also carries a third flange-like element mounted thereon, a fourth flange-like element disposed in spaced parallel ralationship with respect to the third flange-like element, a support frame fixedly mounted on the fourth flange-like element, and a plurality of elongated resilient cross-members extending perpendicular to and interconnecting the first and second and the third and fourth flange-like elements, respectively, the cross-sectional area of the cross-members on any plane parallel to their respective flange-like elements collectively being symmetrically disposed about a pivot axis extending perpendicular to their respective flange-like elements.

15 Claims, 8 Drawing Figures

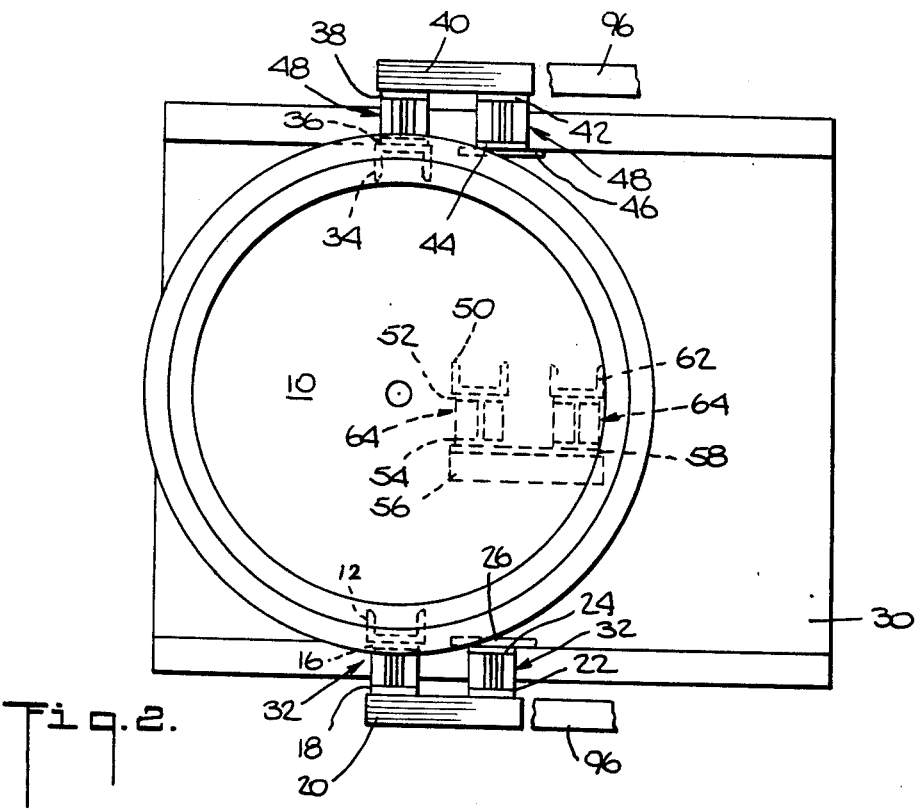

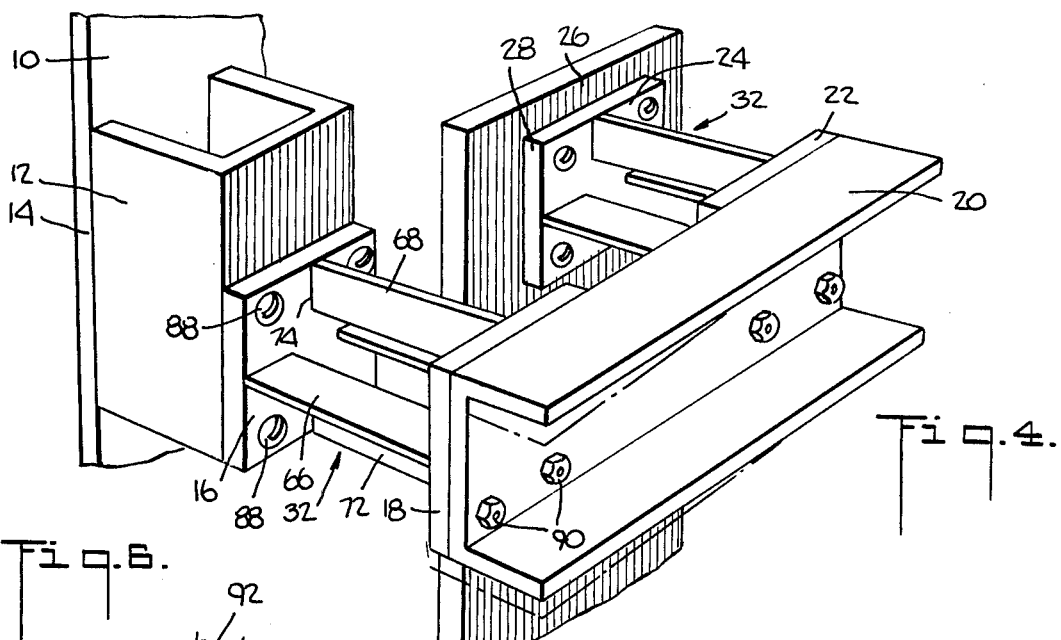
Fig. 4.
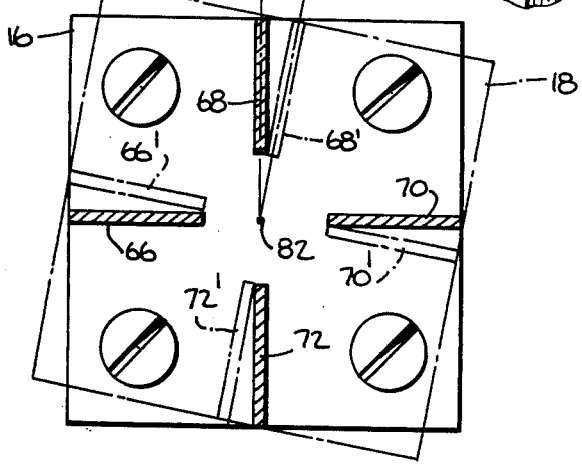
Fig. 6.
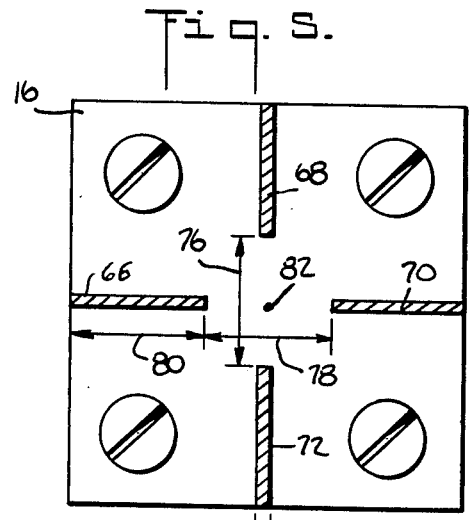
Fig. 5.
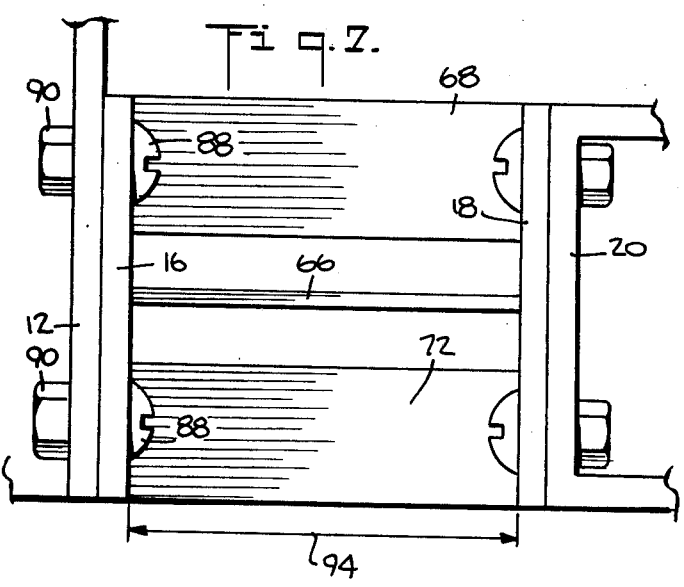
Fig. 7.
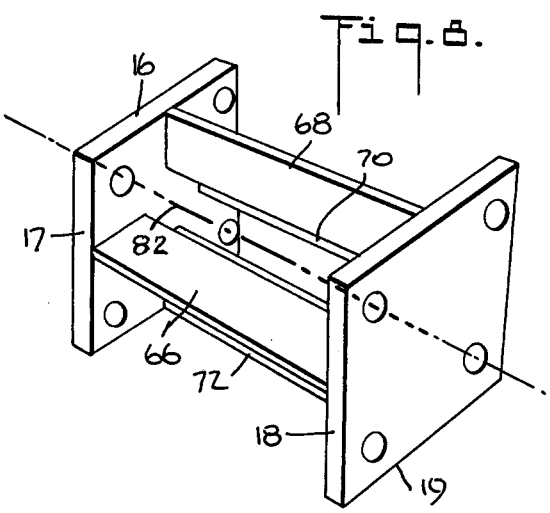
Fig. 8.

FLEXIBLY MOUNTED CONTAINER SYSTEM

This application is a continuation-in-part of my U.S. Pat. application Ser. No. 498,124, filed Aug. 16, 1974, entitled FLEXURAL PIVOT, now abandoned.

This invention relates to a flexibly mounted container system. It is particularly adapted, among many other possible uses, for use in weighing the contents in a container, particularly when the weight of the material in the container is relatively large, for example.

Heretofore, a substantial number and variety of flexibly mounted container systems have been employed utilizing such means as bearings, linkage pins, knife edges, and the like, but they have not been entirely satisfactory due to their lack of sensitivity, particularly with respect to handling relatively large weights. In order to overcome these undesirable characteristics, flexural pivots have been employed, but heretofore they were complicated, expensive to manufacture, bulky and had relatively low load limitations, as a practical matter.

It is an object of this invention to provide a new and improved flexibly mounted container system which involves a novel combination of features combined in such a way as to afford a very efficient and effective solution to the difficulties encountered with the prior art, and which accomplishes the desired results, as will become apparent as the description proceeds. Another object of this invention is to provide an improved flexibly mounted container system which is capable of operating with high sensitivity, linearity, accuracy and repeatability, which is capable of carrying a wide range of loads including very heavy loads of the order of many tons, and which is simple in design and relatively inexpensive to manufacture.

As still another object of the invention, I provide a flexibly mounted container system which forms a substantially frictionless system that is unaffected by dirt and temperature within a relatively large range of operation, and which is substantially corrosion resistant, and which has very minimal wear charcteristics.

Briefly, my invention contemplates the provision of a new and improved flexibly mounted container system charcterized by a container, a mounting bracket fixedly mounted on the container, a first flange-like element fixedly mounted on the mounting bracket, a second spaced flange-like element disposed in spaced parallel relationship with respect to the first flange-like element, a linking member fixedly mounted on the second flange-like element, a third flange-like element fixedly mounted on said linking member, a fourth flange-like element disposed in spaced parallel relationship with respect to the third flange-like element, a support frame fixedly mounted on the fourth flange-like element, and a plurality of elongated resilient cross-members extending substantially perpendicular to and interconnecting the first and second and the third and fourth flange-like elements respectively, the cross-sectional areas of the cross-members on any plane parallel to their respective flange-like elements collectively being symmetrically disposed about a pivot axis extending perpendicular to their respective flange-like elements.

According to one aspect of the invention, a first mounting bracket is mounted on one side of the container and a second mounting bracket is mounted on the opposite side of the container. Flexural pivot means are mounted on the second mounting bracket which are similar to those described hereinbefore in connection with the first mounting bracket. In addition, in accordance with still another aspect of my invention, a third mounting bracket is mounted on the bottom of the container and flexural pivot means are mounted on this bracket which are proportionally similar to the first and second pivots described hereinbefore, thereby fully supporting the container and preventing undesirable lateral movements thereof.

In one form of the invention there are four substantially identical cross-members interconnecting their respective flanges and, preferably, the cross-members are fabricated from stainless steel selected from the group consisting of AISI type 410, AISI type 420 and AISI type 440, tempered, i.e., heat treated, to a hardness between about 42 to about 55 Rockwell C. Preferably, the flange-like elements are fabricated from AISI type 304 stainless steel. According to one aspect of the invention the cross-members, between their corresponding flange-like elements, are ribbon-like members and each of the members is disposed in spaced relationship with respect to the other cross-members. According to another aspect thereof, the cross-members between respective flange-like members are disposed in two mutually perpendicular planes. Preferably, the width of each of the members is substantially greater than the thickness thereof and the length of each of the members is substantially greater that the width thereof.

Still further, in accordance with another aspect of the invention the four cross-members extend perpendicular to their respective flange-like elements, two of the cross-members being disposed in one plane and the other two being disposed in a second plane perpendicular to the first plane, the four cross-members being symmetrically disposed about a pivot axis extending perpendicular to their corresponding flange-like elements, and the cross-members are equidistantly spaced from the pivot axis. Preferably, the two members in one plane are spaced apart a distance substantially equal to the width of the cross-members. According to a feature of the invention, the cross-members are ribbon-like members and the width of each member is substantially greater than the thickness thereof and the length of each of the members is substantially greater than the width thereof. Preferably, the width of each of the cross-members is of the order of about 12.9 times the thickness thereof and the length of each of the cross-members is of the order of about 2.42 times the width thereof.

There has thus been outlined rather broadly the more important features of the invention in order that the detailed description that follows may be better understood, and in order that the present contribution to the art may be better appreciated. There are, of course, additional features of the invention that will be disclosed more fully hereinafter. Those skilled in the art will appreciate that the conception on which this disclosure is based may readily be utilized as the basis for the design of other structures for carrying out the several purposes of the invention.

It is important, therefore, that this disclosure be regarded as including such equivalent constructions as do not depart from the spirit and scope of the invention.

One embodiment of the invention has been choosen for purposes of illustration and description, and is shown in the accompanying drawings, forming a part of the specification, wherein;

FIG. 2 is a plan view of the system of FIG. 1;

FIG. 3 is a side elevation of the system of FIG. 1;

FIG. 4 is an enlarged detailed perspective view showing details of the flexural pivot mounting means of the container on the support frame;

FIG. 5 is a transverse sectional view of the mounting means of FIG. 4, showing the flexural pivot means in its normal or neutral position;

FIG. 6 is a transverse sectional view similar to FIG. 5, but showing the flexural pivot means in its pivoted or rotated state;

FIG. 7 is an enlarged front elevation of the mounting means of FIG. 4; and

FIG. 8 is an enlarged perspective view of one flexural pivot of the mounting means.

Figure 1:
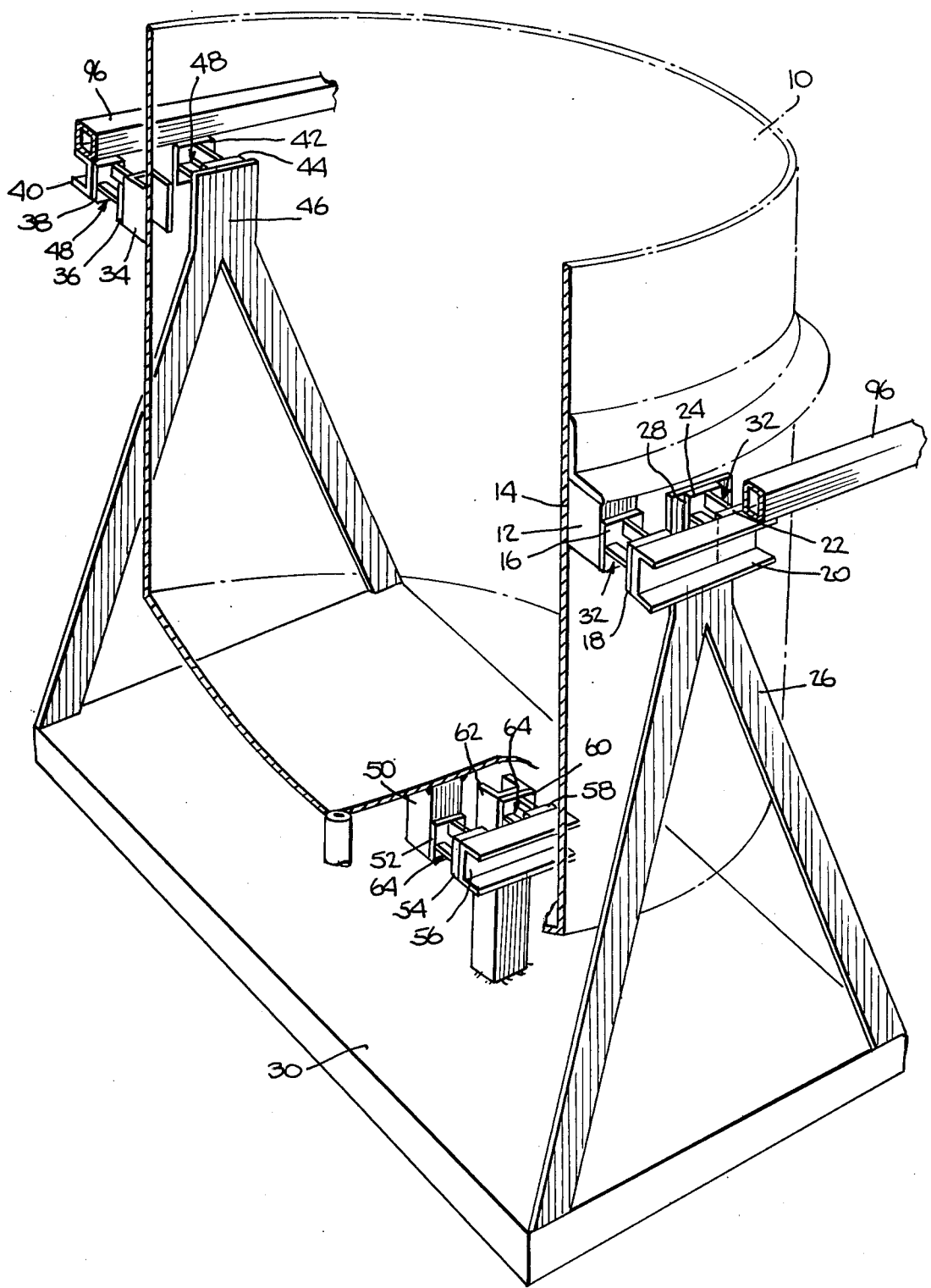
FIG. 1 is a perspective view of one embodiment of a flexibly mounted container system constructed in accordance with the concept of the invention.

In the illustrated embodiment of the invention, as best seen in FIGS. 1 to 3, the flexibly mounted container system comprises, a container 10, which is capable of carrying a wide range of loads including very heavy loads of the order of many tons, for example. A first mounting bracket 12 is fixedly mounted on the container as at 14, preferably on the side wall, toward the upper end thereof. A first flange-like element 16 is fixedly mounted on the first mounting bracket 12. A second flange-like element 18 is disposed in spaced, parallel relationship with respect to the first flange-like element 16.

A linking member 20 is fixedly mounted on the second flange-like element 18 and a third flange-like element 22 is fixedly mounted on the linking member 20. A fourth flange-like element 24 is disposed in spaced, parallel relationship with respect to the third flange-like element 22. A support frame 26 is fixedly mounted on the fourth flange-like element 24, as at 28. The base of this support frame is mounted on a base plate 30, provided for the purpose. A plurality of elongated, resilient cross-members, indicated generally at 32, extend perpendicular to and interconnect the first and second flange-like elements 16 and 18 and the third and fourth flange-like elements 22 and 24, respectively. The function and operation of these cross-members will be discussed more fully hereinafter.

A second mounting bracket 34 is fixedly mounted on the container 10 on the upper side wall opposite the first mounting bracket 12. A fifth flange-like element 36 is mounted on the mounting bracket 34 and a sixth spaced, flange-like element 38 is disposed in spaced parallel relationship with respect to the fifth flange-like element 36. A linking member 40 is fixedly mounted on the sixth flange-like element 38 and a seventh flange-like element 32 is fixedly mounted on the linking member 40. An eighth flange-like element 44 is disposed in spaced, parallel relationship with respect to the seventh flange-like element 42, and a support frame 46 is fixedly mounted on the eighth flange-like element 44. The support frame 46 is also mounted on the base plate 30. A plurality of elongated resilient cross-members indicated generally at 48 extend perpendicular to and interconnect the fifth and sixth flange-like elements 36 and 38 and the seventh and eighth flange-like elements 42 and 44, respectively. The cross-sectional area of the cross-members on any plane parallel to their respective flange-like elements collectively are symmetrically disposed about a pivot axis extending perpendicular to their respective flange-like elements.

Still referring to FIGS. 1, 2 and 3, a third bracket 50 is fixedly mounted on the bottom of the container 10, and a ninth flange-like element 52 is fixedly mounted on this bracket. A tenth spaced flange-like element 54 is disposed in parallel relationship with respect to the ninth flange-like element 52, and a third linking member 56 is fixedly mounted on the tenth flange-like element 54. An eleventh flange-like element 58 is fixedly mounted on the linking member 56, and a twelfth flange-like element 60 is disposed in spaced, parallel relationship with respect to the eleventh flange-like element 58. A support frame 62 is fixedly mounted on the twelfth flange-like element 60. A plurality of elongated resilient cross-members, indicated generally at 64, extend perpendicular to and interconnect the ninth and tenth flange-like elements 52 and 54 and the eleventh and twelfth flange-like elements 58 and 60, respectively, and the cross-sectional area of the cross-members on any plane parallel to their corresponding flange-like elements collectively being symmetrically disposed about a pivot axis extending perpendicular to their respective flange-like elements.

It will be appreciated that the flange-like elements 16, 18, 22, 24, 36, 38, 42 and 44 are all preferably identical and the elongated, resilient cross-members 32 and 48 are also preferably identical. The flange-like elements 52, 54, 58 and 60 are preferably smaller than the flange-like elements 16 and 18, but of proportional configuration. The elongated resilient cross-members 64 are preferably smaller than the cross-members 32 and 48, but are also of proportional configuration. This is due to the fact that the pivotal support means on the sides of the container carry most of the weight of the container, while the pivotal mounting means at the base of the container serves primarily to prevent undesirable lateral movement. In order to simplify the explanation of the mounting means only the flange-like elements 16, 18, 22 and 24 and their corresponding cross-members 32 will be discussed in detail hereinafter as the two other pivotal mounting means are constructed and functioned in a similar manner.

As best seen in FIGS. 4 to 8, the plurality of elongated, resilient cross-members 32 comprise four ribbon-like, elongated resilient substantially identical cross-members 66, 68, 70 and 72 interposed between the two flanges 16 and 18, and the ends thereof are welded or otherwise fixedly attached to the flanges, as at 74, for example. As best seen in FIG. 5, the cross-members 68 and 72 are disposed in one plane and the cross-members 66 and 70 are disposed in a second plane perpendicular to the first plane. The spacing, indicated at 76, between the cross-members 68 and 72, is substantially equal to the spacing 78 between the cross-members 66 and 70, and the length of the spacing 76 and 78 is substantially equal to the width 80 of each cross-member.

The four cross-members are symmetrically disposed about a pivot axis indicated at 82 in FIGS. 5, 6 and 8, which extends perpendicular to the flange-like elements 16 and 18, and the cross-members are equidistantly spaced from this pivot axis.

The cross-members are ribbon-like members and the width 80 of each member is substantially greater than the thickness, indicated at 84 in FIG. 5. The length indicated at 86 in FIG. 7, of each of said cross-members is substantially greater than the width 80 thereof.

The flange-like element 16 is fixedly mounted on the bracket 12 and the flange-like element 18 is fixedly mounted on the linking member 20, as by means of bolts and nuts 88 and 90, respectively. In operation, when the two flange-like elements 16 and 18 are in their normal or neutral positions, the cross-members 66, 68, 70 and 72 are in their positions as shown in FIG. 5. When a torque is applied to the flange-like element 16 as by means of adding weight to the container, the flange-like element 18 is rotated with respect to the other flange-like element 16 through an angle, as indicated at 92 in FIG. 6, thereby twisting the cross-members 66, 68, 70 and 72. That is, the cross-members are twisted substantially uniformly throughout the length thereof so that the ends adjacent the flange 16 are positioned as indicated by the solid lines in FIG. 6 and the ends adjacent the flange element 18 are positioned as indicated by the broken lines 66', 68', 70' and 72' in FIG. 6. Upon release of the torque applied, as when the container is empty, the flanges will return to their neutral positions as indicated in FIG. 5, due to the resiliency of the cross-members. At the same time, the flange-like element 22 will be rotated the same amount in the opposite direction with respect to the flange-like element 24, whereby the flange-like elements 16 and 24 will remain parallel at all times, but the flange-like element 16 will move up and down with respect to the flange-like element 24, as the weight increases or decreases in the container 10. The relative movement of the flanges 16 and 24 in the vertical direction will reliably indicate the weight added or substracted from the container 10 in linear manner. It will be particularly appreciated that the linearity of movement is of high sensitivity, accuracy and repeatability in spite of the fact that the loads carried in the container may be very heavy, of the order of many tons, for example. Thus, the operation can be repeated almost indefinitely with a very high degree of accuracy of the forward movement and return movement of the flanges. In view of the fact that the four cross-members are symmetrically disposed about the pivot axis 82, there is a direct linear relationship between the torque applied and the angle of rotation 92.

In order to measure the relative movement of the flanges 16 and 24, thereby indicating the weight added or substracted from the container 10, I provide a sensor beam 96, FIG. 3, having one end fixably mounted on the linking member 20. The other end of the sensor beam is connected to a deflection sensor 98, which may be of any known commercial type, such as a linear variable differential transformer (LVDT), for example. The length of the sensor beam 96 is so selected as to provide a reasonable degree of amplification of the relative movement of the linking member 20. It will be appreciated that in some installations the weight in the container may vary between 0 and 2,000 pounds, whereas in other installations, the weight may vary between 0 and 4,000 pounds, for example. In order to maintain the range of the deflection sensor 98 substantially constant, for standardization purposes, I provide a spring member 100, which has one end fixedly mounted with respect to the sensor beam, as at 102, and the other end thereof is connected to the sensor beam. Thus, the spring constant of the spring 100 is so selected as to compensate for the load range of the container, thereby maintaining a substantially constant deflection range for the deflection sensor, regardless of the weight range of the container.

The cross-members may be fabricated from any suitable material such as stainless steel selected from the group consisting of AISI type 410, AISI type 420 and AISI type 440, tempered to a hardness between about 42 and about 55 Rockwell C. Preferably, the angle of rotation 92 is up to about ten degrees. Generally, the flange-like elements 16, 18, 22 and 24 are fabricated from AISI type 304 stainless steel. Once the cross-members 66, 68, 70, 72 are welded to the flanges, the two end surfaces 17 and 19, FIG. 8, are machined for proper dimension. Then the entire flexural pivot means is heat treated, which anneals the two flanges 16 and 18 and spring tempers the cross-members 66, 68, 70 and 72 to about 42–45 Rockwell C hardness. The cross-members become hardened due to the heat treating process.

As an example of a flexural pivot means constructed according to the invention, each of the cross-member has a thickness 84 of about 0.092 inches, a width 80 of about 1.187 inches and a length 94 of about 2.875 inches. This flexural pivot has a three degree radial movement (angle 92) when approximately 100 foot-pounds of torque is applied to the flange-like element 16 with respect to the other flange-like element 18.

It will be appreciated that the total cross-sectional area of the cross-members, i.e. the thickness 84 and the width 80 as well as the number of cross-members, is so selected that the cross-members can withstand the compressive (or tensional) force acting perpendicularly between the structural members between the complementary flange-like members, as necessary for the particular installation. Compressive forces of up to 10 tons, or substantially more, are not uncommon, and can be employed with the flexural pivot means of this invention. Preferably, the temperature operating range of the flexural pivot means is between about −20° and about +160° F. Within this temperature range the flexural pivot means performs extremely well with a very minimum amount of distortion.

It will thus be seen that the present invention does indeed provide an improved flexably mounted container system, which is superior in simplicity, operability, and accuracy as compared to prior art such systems.

Although a particular embodiment of the invention is herein disclosed for purposes of explanation, various modifications thereof, after study of this specification, will be apparent to those skilled in the art to which the invention pertains.

What is claimed and desired to be secured by Letters Patent is:

1. A flexibly mounted container system comprising a container, a mounting bracket fixedly mounted on said container, a first flange-like element fixedly mounted on said mounting bracket, a second flange-like element disposed in spaced parallel relationship with respect to said first flange-like element, a linking member fixedly mounted on said second flange-like element, a third flange-like element fixedly mounted on said linking member, a fourth flange-like element disposed in spaced, parallel relationship with respect to said third flange-like element, a support frame fixedly mounted on said fourth flange-like element, and a plurality of elongated resilient cross-members extending perpendicular to and interconnecting said first and second and said third and fourth flange-like elements respectively, the cross-sectional area of said cross-members on any plane parallel to their respective flange-like elements collectively being symmetrically disposed about a pivot axis extending perpendicular to their respective flange-like elements, and means for continuously detecting the movement of said container to determine the change in weight contained therein.

2. A flexibly mounted container system according to claim 1 wherein there are four flange-like elements disposed between said first and second flange-like elements and between said third and fourth flange-like elements respectively, which are substantially parallel one with respect to the others.

3. A flexibly mounted container system according to claim 1 wherein said first and fourth flange-like elements are in the same plane and said second and third flange-like elements are in the same plane.

4. A flexibly mounted container system according to claim 1 wherein said cross-members are fabricated from stainless steel selected from the group consisting of AISI type 410, AISI type 420 and AISI type 440, tempered for spring resiliency.

5. A flexibly mounted container system according to claim 1 wherein said cross-members between said first and second flange-like elements and between said third and fourth flange-like elements are ribbon-like members and each of said cross-members is disposed in spaced relationship with respect to their adjacent cross-members.

6. A flexibly mounted container system according to claim 1 wherein said cross-members between said first and second flange-like elements and between said third and fourth flange-like elements, respectively, are disposed in at least two mutually perpendicular planes.

7. A flexibly mounted container system according to claim 1 wherein the width of each of said cross-members is of the order of about 12.9 times the thickness thereof and the length of each of said cross-members is of the order of about 2.42 times the width thereof.

8. A flexible mounted container system according to claim 1 wherein said first mounting bracket is disposed on one side of said container, and said system further comprises a second mounting bracket fixedly mounted on the opposite side of said container, a fifth flange-like element fixedly mounted on said second mounting bracket, a sixth flange-like element disposed in spaced parallel relationship with respect to said fifth flange-like element, a second linking member fixedly mounted on said sixth flange-like element, a seventh flange-like element fixedly mounted on said linking member, an eighth flange-like element disposed in space parallel relationship with respect to said seventh flange-like element, a second support frame fixedly mounted on said eighth flange-like element, and a plurality of elongated resilient cross-members extending perpendicular to and interconnecting said fifth and sixth and said seventh and eighth flange-like elements respectively, the cross-sectional area of said cross-members on any plane parallel to their respective flange-like elements collectively being symmetrically disposed about a pivot axis extending perpendicular to their respective flange-like elements.

9. A flexibly mounted container system according to claim 8 further comprising a third mounting bracket fixedly mounted towards the bottom of said container a ninth flange-like element fixedly mounted on said mounting bracket, a tenth spaced flange-like element disposed in spaced parallel relationship with respect to said ninth flange-like element, a third linking member fixedly mounted on said tenth flange-like element, an eleventh flange-like element fixedly mounted on said third linking member, a twelfth flange-like element disposed in spaced paralled relationship with respect to said eleventh flange like element, a third support frame fixedly mounted on said twelfth flange-like element, and a plurality of elongated resilient cross-members extending perpendicular to and interconnecting said ninth and tenth and said eleventh and twelfth flange-like elements respectively, the cross-sectional area of said cross-members on any plane parallel to their respective flange-like elements collectively being symmetrically disposed about a pivot axis extending perpendicular to their respective flange-like elements.

10. A flexibly mounted container system according to claim 1 wherein said means for continuously detecting the movement of said container to determine the change in weight contained therein comprises a sensor beam having one end fixedly connected to said linking member, and deflection sensor means connected to the other end of said sensor beam, whereby the deflection sensor means detects the change in weight contained in said container.

11. A flexibly mounted container system according to claim 10, further comprising spring means having one end connected to said sensor beam and having the other end fixedly mounted with respect to said sensor beam, whereby the deflection range of said sensor means is substantially constant regardless of the range of weight carried by said container.

12. A flexibly mounted container system according to claim 1 wherein there are four substantially identical cross-members which are of ribbon-like shape with the width of each member being substantially greater than the thickness thereof and the length of each member being substantially greater than the width thereof mounted between said first and second flange-like elements and between said third and fourth flange-like elements, respectively.

13. A flexibly mounted container system according to claim 12 wherein two of the cross-members disposed between said first and second flange-like elements are disposed in one plane and the other two cross-members are disposed in a second plane perpendicular to the first plane, said four cross-members being symmetrically disposed about a pivot axis extending perpendicularly to said first and second flange-like elements, and said four cross-members being equidistantly spaced from said pivot axis.

14. A flexibly mounted container system according to claim 13 wherein the two cross-members in one plane are spaced a distance apart substantially equal to the width of said cross-members.

15. A flexibly mounted container system according to claim 13 wherein two of the cross-members disposed between said third and fourth flange-like elements are disposed in one plane and the other two cross-members are disposed in a second plane perpendicular to the first plane, said four cross-members being symmetrically disposed about a pivot axis extending perpendicularly to their respective flange-like elements, and said four cross-members being equidistantly spaced from said pivot axis.

* * * * *